V. P. LE ROY.
REPAIR PATCH FOR PNEUMATIC TIRES.
APPLICATION FILED JUNE 6, 1913.
1,102,061.
Patented June 30, 1914.
2 SHEETS—SHEET 2.
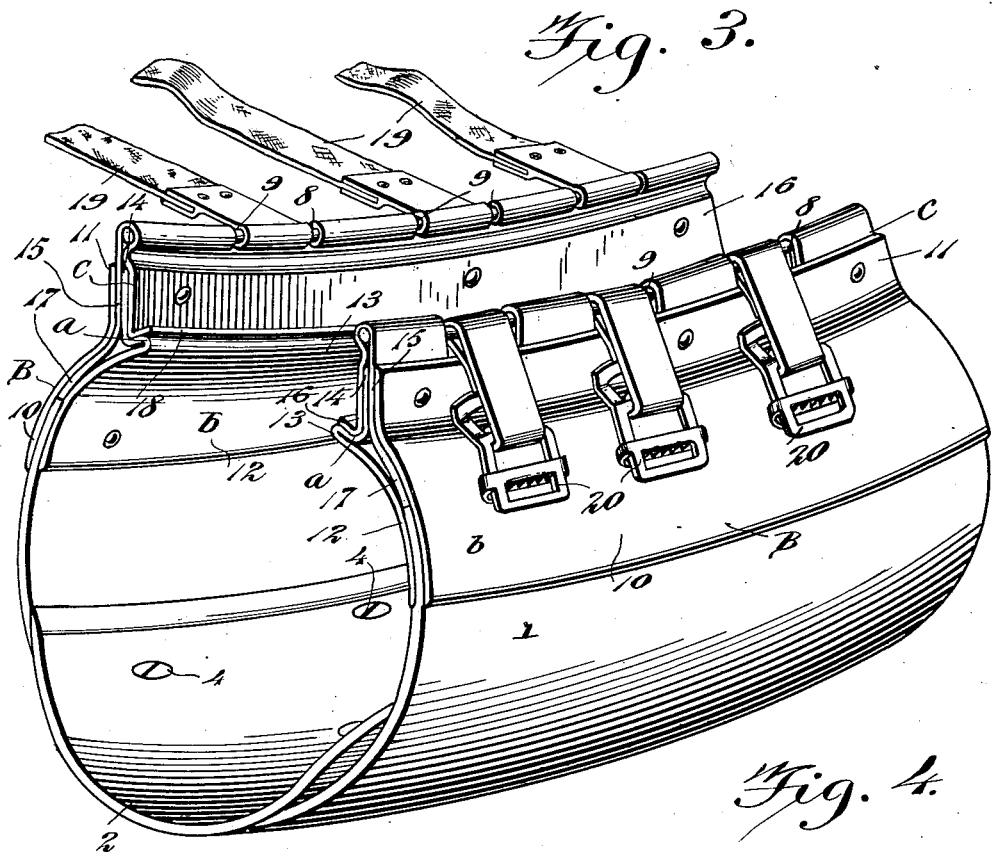
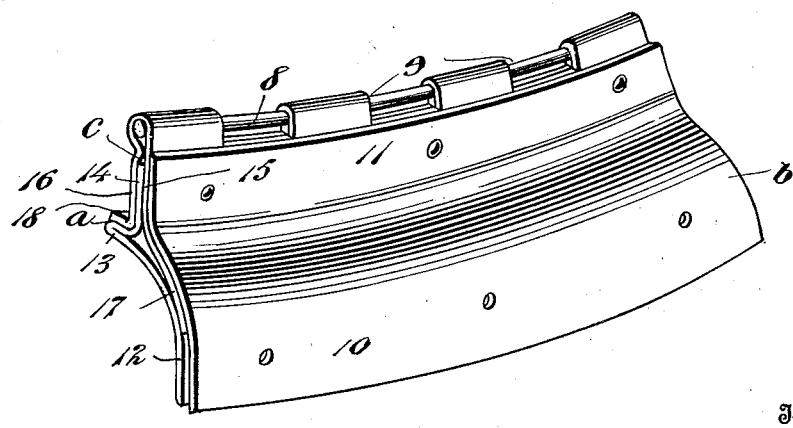

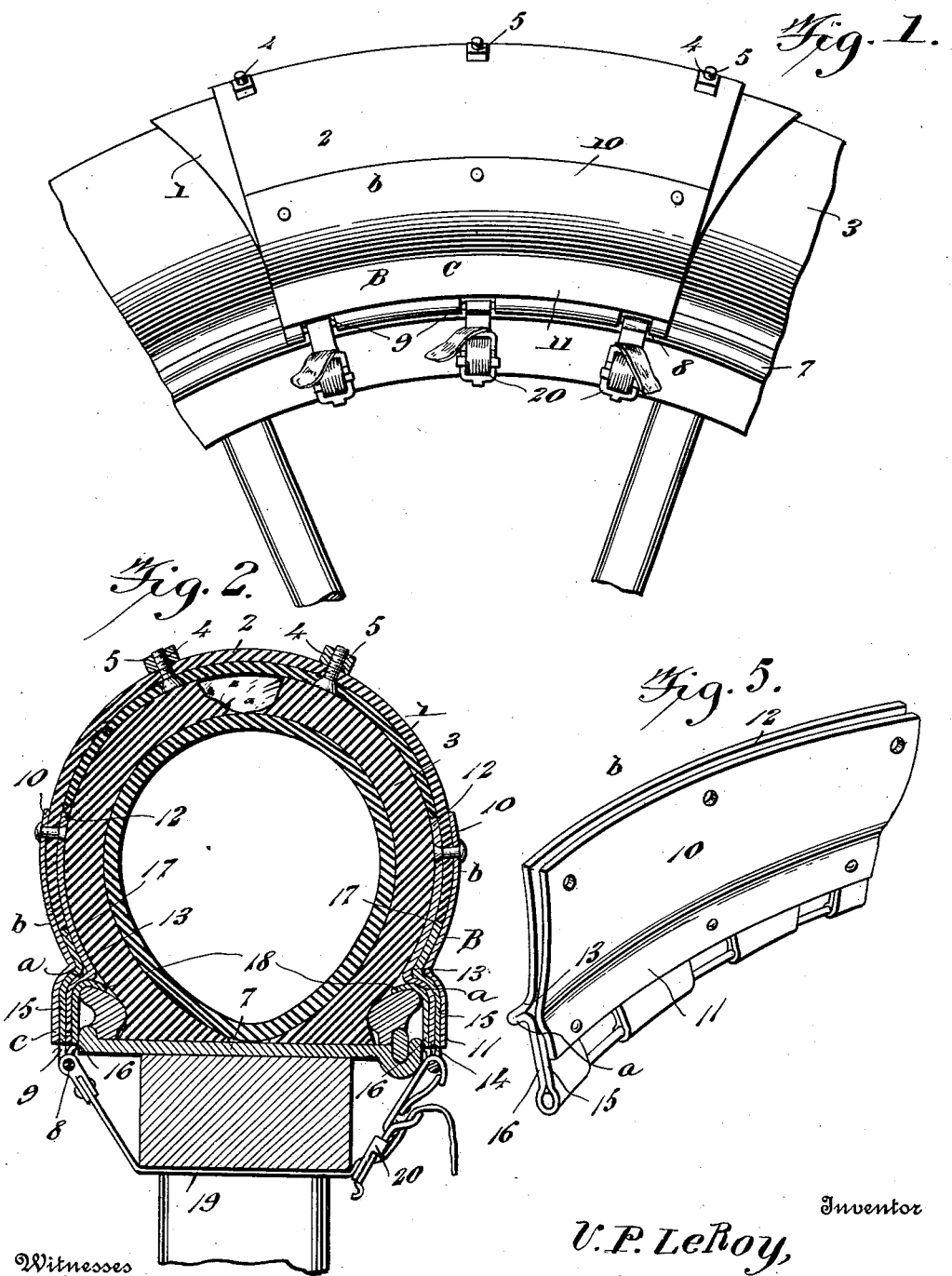

UNITED STATES PATENT OFFICE.

VANALLEN P. LE ROY, OF NEWBURGH, NEW YORK.

REPAIR-PATCH FOR PNEUMATIC TIRES.

1,102,061.  Specification of Letters Patent.  Patented June 30, 1914.

Application filed June 6, 1913. Serial No. 772,174.

*To all whom it may concern:*

Be it known that I, VANALLEN P. LE ROY, a citizen of the United States, residing at Newburgh, in the county of Orange and State of New York, have invented new and useful Improvements in Repair-Patches for Pneumatic Tires, of which the following is a specification.

The invention relates to means whereby temporary repairs may be made to pneumatic tires to safely carry the motorist to a place where permanent repairs may be made in the event of a puncture, blow-out, rim cut or other injury to the casing.

The invention also provides means for preventing grit, dust or other foreign matter from working its way into a cut, also to exclude dampness and to prevent the separation of the rubber from the textile part of the casing in the event of a blister or the rubber becoming loose in places.

The invention provides a shoe which may be secured to the casing and rim so as to reinforce a weak spot in the tire resulting from any cause, said shoe being readily attachable and detachable and when in position forming a reinforcement or strengthening means to the weak spot and preventing blow-out or other injury which would tend to disable a pneumatic tire.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a perspective view of a portion of a vehicle wheel and pneumatic tire, showing the application of the invention. Fig. 2 is a transverse section. Fig. 3 is a perspective view of the shoe detached from the wheel and having the side portions partly spaced. Fig. 4 is a detail perspective view of one of the metal fittings secured to an edge portion of the shoe. Fig. 5 is a view similar to Fig. 4 of a modification.

Corresponding and like parts are referred to in the following description, and indicated in all the views of the drawings, by the same reference characters.

The shoe comprises a patch 1, a binder 2 and similar metal fittings B, which are secured to edge portions of the binder 2. The patch 1 may be of any material and usually consists of layers of rubber and canvas, the same being cemented together and having their edge portions scarfed to make a close fit with the outer side of the casing 3 of the pneumatic tire. The binder 2 may be of any flexible material and usually consists of layers of rubber and canvas which are cemented together in the usual manner commonly practised in the building up of casings, patches and the like of pneumatic tires. The shoe may be of any length and size depending upon the special use for which constructed. The patch 1 is placed upon the inner side of the binder 2 and is secured thereto in any manner. As shown a plurality of studs 4 are passed through the patch and binder and their projecting ends are threaded and receive nuts 5. The nuts 5 and projecting ends of the studs 4 result in the provision of calks or projections which receive and sustain the wear and also serve to prevent slipping.

Each metal fitting B is of like construction and comprises a lip *a*, an attaching flap *b* and an offstanding wing *c*. The attaching flap *b* comprises companion members which are spaced apart and receive between them an edge portion of the binder 2, said parts being connected by means of rivets or other fastening means. The lip *a* is designed to engage the edge portion of the casing 3 at or near the clencher bead or like part. This offstanding wing *c* extends along the side of the rim or felly 7 of the vehicle wheel and is adapted to receive the fastening means at its outer edge. The wing *c* comprises parts which are folded upon each other, the folded edge receiving a wire or rod 8 and said folded edge having portions cutaway, as indicated at 9, thereby exposing parts of the wire or rod 8 to admit of any fastening means being attached thereto. In the preferred construction the offstanding wing *c* comprises a plurality of parts which are placed together and secured by means of rivets or the like.

As shown most clearly in Fig. 4 the attaching flap *b* is formed of two pieces of sheet metal, the outer piece comprising wings 10 and 11 and the inner piece comprising a wing 12, fold 13, and wing 14. The wing *c* is constructed of a strip which is folded upon itself to provide the wings 15 and 16 and having such folded portions bent outwardly to provide wings 17 and 18. The wing 17 comes between the wings 10 and 12, whereas the wing 18 overlaps the fold 13. The wing 15 is arranged between the wings 11 and 14 and the wing 16 is exterior to the wing 14. The several wings 11, 15, 14 and 16 are secured by means of rivets or other fastenings, thereby producing an offstanding wing possessing great strength and enabling the fitting B to be easily and cheaply constructed. In the modification shown in Fig. 5 the fitting is formed of two pieces or blanks, the outer piece being similar to that shown most clearly in Fig. 4 and embodying wings 10 and 11. The inner or remaining piece comprises a wing 12, fold 13 and wings 15 and 16, the several wings 11, 15 and 16 overlapping and forming the offstanding wing c. The fold between the wings 15 and 16 receives the wire 8 and is notched to form the spaces or cutaway portions 9 to receive the fastening means.

It is to be understood that the outer edges of the offstanding wings c may be connected in any manner and as shown straps 19 are attached to one of the fittings and buckles 20 are secured to the other fitting, said straps and buckles being utilized to connect the shoe about the rim of the wheel when such shoe is placed in position to strengthen or reinforce the casing 3.

When it becomes necessary to protect a part of a casing of a pneumatic tire for any cause, such as a blowout, rim cut, puncture, blister, bruise or the like, the patch is placed upon the casing with the binder passing about the casing and the metal fitting extending along opposite sides of the rim or felly 7 of the wheel, the offstanding wings c being connected by means of the fastenings or in any manner. It is observed that the lips a engage edge portions of the casing close to the retaining flanges of the rim, the shoe as a whole being firmly and securely held in place by the lever action of the offstanding wings c, which extend along the sides of the rim or felly and are firmly connected at their upper edges along the inner side of such rim or felly. The construction is such as to admit of the shoe being quickly placed in position or readily removed, whether the tire be inflated or deflated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:

A repair shoe for pneumatic tires comprising a flexible binder, metal fittings secured to the edges of the binder, each of such fittings comprising an attaching flap embodying spaced members embracing opposite sides of the binder and secured thereto, a lip bearing against the rim and consisting of a fold and an offstanding wing embodying a plurality of overlapping members which are secured together, two of such members being connected by means of a fold which has portions cut away at intervals, a wire supported in the fold and exposed at intervals by the cut away portion of such folds, and fastening means connected with the wires of the metal fittings opposite the cut away portions of the offstanding wings.

In testimony whereof I affix my signature in presence of two witnesses.

VANALLEN P. LE ROY.

Witnesses:
F. W. TOMPKINS,
PETER CANTLINE.

---

Copies of this patent may be obtained for five cents each, by addressing the "Commissioner of Patents, Washington, D. C."